(12) United States Patent
Vinh

(10) Patent No.: US 6,671,706 B1
(45) Date of Patent: Dec. 30, 2003

(54) METHOD AND SYSTEM FOR EDITING THE CONTENT OF A WEB SITE WITH A FACSIMILE TRANSMISSION

(76) Inventor: Keith Vinh, 7203 Osage St., Houston, TX (US) 77036

( * ) Notice: Subject to any disclaimer, the term of this patent is extended or adjusted under 35 U.S.C. 154(b) by 481 days.

(21) Appl. No.: 09/638,802

(22) Filed: Aug. 12, 2000

(51) Int. Cl.[7] .............................................. G06F 12/00
(52) U.S. Cl. .......................... 707/204; 707/200; 707/2; 707/104.1
(58) Field of Search .............................. 707/100–104.1, 707/200, 204, 1–10

(56) References Cited

U.S. PATENT DOCUMENTS

| | | | | |
|---|---|---|---|---|
| 5,675,507 A | * | 10/1997 | Bobo, II | 709/206 |
| 5,764,906 A | * | 6/1998 | Edelstein et al. | 709/219 |
| 5,819,271 A | * | 10/1998 | Mahoney et al. | 707/9 |
| 5,848,413 A | * | 12/1998 | Wolff | 707/10 |
| 5,864,871 A | * | 1/1999 | Kitain et al. | 707/104.1 |
| 5,873,077 A | * | 2/1999 | Kanoh et al. | 707/3 |
| 5,907,598 A | * | 5/1999 | Mandalia et al. | 379/100.01 |
| 5,938,727 A | * | 8/1999 | Ikeda | 709/218 |
| 5,945,989 A | | 8/1999 | Freishtat et al. | |
| 5,991,739 A | * | 11/1999 | Cupps et al. | 705/26 |
| 6,278,532 B1 | * | 8/2001 | Heimendinger et al. | 358/442 |
| 6,348,970 B1 | * | 2/2002 | Marx | 358/1.15 |
| 6,446,115 B2 | * | 9/2002 | Powers | 709/206 |

OTHER PUBLICATIONS

Cardiff Software, Inc., Product Description for Teleform Enterprise Nov. 28, 2000 www.cardiff.com/products/enterprise/ , pp. 1–2.
Cardiff Software, Inc., Product Description for Teleform Standard Nov. 28, 2000 www.cardiff.com/products/standard/ , pp. 1–2.
Cardiff Software, Inc., Product Description for Teleform Elite Nov. 28, 2000 www.cardiff.com/products/elite/ , pp. 1–2.
Cardiff Software, Inc., "Teleform Elite Input Agents", www.cardiff.com/products/elite/agents.asp, pp. 1.
Cardiff Software, Inc., "TELEform Elite Design", www.cardiff.com/products/elite/design.asp, pp. 1–2.
Cardiff Software, Inc., "TELEform Elite Recognition", www.cardiff.com/products/elite/recogn.asp, pp. 1.
Cardiff Software, Inc., "TELEform Elite Verification", www.cardiff.com/products/elite/verify.asp, pp. 1.
Cardiff Software, Inc., "TELEform Elite Document Capture", www.cardiff/com/products/elite/capture.asp, pp. 1–2.
Cardiff Software, Inc., "TELEform Elite Export", www.cardiff.com/products/elite/export.asp, pp. 1.
Cardiff Software, Inc., "TELEform Elite Features", www.cardiff.com/products/elite/features.asp, pp. 1–3.
Cardiff Software, Inc., "TELEform Elite Requirements", www.cardiff.com/products/elite/reg.asp, pp. 1.

* cited by examiner

Primary Examiner—Greta Robinson
Assistant Examiner—Linh Black
(74) Attorney, Agent, or Firm—David Finh

(57) ABSTRACT

A method of updating a Web site maintained by a web server capable of receiving and responding to requests for information from Web clients and coupled to a computer database comprising the steps of transmitting an encoded transmission comprising a first portion in the format of a facsimile communication intended to be converted into digital information suitable for being stored in the computer database and a second portion identifying a key to be used by the computer database for storing the digital information. Receiving the encoded transmission and converting the first portion into digital information having a predetermined format. Storing the digital information in the computer database using the second portion as a key to the computer database. Wherein upon receiving a request from a Web client, the Web server retrieves the digital information from the computer database and transmits the digital information to the Web client in a format compatible with the request received from Web client.

10 Claims, 22 Drawing Sheets

Restaurant Registration - Part 1 of 3
Please write legible and in print

Restaurant: [____]
Address: [____]
[____]
City: [____]
State: [__] Zip: [____]-[___]
Telephone: ([___]) [___]-[____]
Fax: ([___]) [___]-[____]

Reservation By
○ Email  ○ Fax e-Mail: [____]
Web: www [____]
Contact: [____]

---

Business Days/Hours
　　　　　　　　　　　　　　　　　　　　　HH　　MM
○Mon ○Tue ○Wed ○Thu ○Fri ○Sat ○Sun   From [__]:[__]  To [__]:[__]
○Mon ○Tue ○Wed ○Thu ○Fri ○Sat ○Sun   From [__]:[__]  To [__]:[__]
*Please use 24 hours (HH,MM) format*

---

Cuisine
○American ○Indian
○Chinese ○Thai
○French ○Japanese
○Italian ○Korean
○Mexican ○Greek

Payment Types
○AMX ○Diners Club
○Master Card ○Carte Blanche
○Discover ○Visa
○Check

Specialty
○Barbeque ○Steakhouse
○Bistro ○Vegetarian
○Cajun ○Salad Bar
○Deli ○Sandwiches
○Pizza ○Coffee House
○Seafood ○Burger

Location
○North ○North/East
○North/West ○South
○South/East ○South/West
○East ○West
○Down Town

Frame For 'Menu Du Jour'
○1 ○2 ○3 ○4 ○5 ○6
○7 ○8 ○9 ○10 ○11 ○12

*FIG. 5a*

/517

Restaurant Registration - Part 2 of 3
Please write legible and in print

Please check all that apply
- Smoking
- Valet Parking
- Catering
- Private Parties
- Full Bar
- Reservation Required
- Outdoor Seating
- Sunday Brunch
- Live Entertainment Happy Hours
○Mon ○Tue ○Wed ○Thu ○Fri ○Sat ○Sun  From HH:MM  To HH:MM
○Mon ○Tue ○Wed ○Thu ○Fri ○Sat ○Sun  From ☐☐:☐☐  To ☐☐:☐☐
Please use 24 hours (HH,MM) format Delivery Hours
○Mon ○Tue ○Wed ○Thu ○Fri ○Sat ○Sun  From ☐☐:☐☐  To ☐☐:☐☐
○Mon ○Tue ○Wed ○Thu ○Fri ○Sat ○Sun  From ☐☐:☐☐  To ☐☐:☐☐
Minimum Order  $☐☐☐.☐☐
Please use 24 hours (HH,MM) format Restaurant Picture (optional)

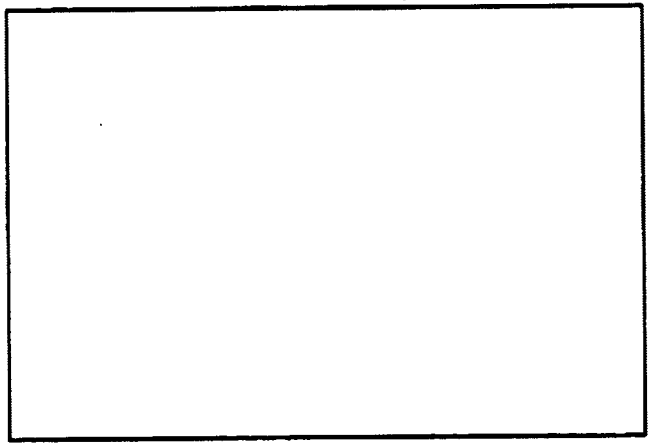

Restaurant Update
Please write legible and in print

*600000*  —532
—533 (Account)
—524

Restaurant ☐☐☐...
Address ☐☐☐...
City ☐☐☐...
State ☐☐  Zip ☐☐☐☐-☐☐☐
Telephone (☐☐☐) ☐☐☐-☐☐☐☐
Fax (☐☐☐) ☐☐☐-☐☐☐☐

Reservation By
○ Email  ○ Fax e-Mail ☐☐☐...
Web |w|w|w|☐☐☐...
Contact ☐☐☐...

—537

Business Days/Hours                      HH    MM
○Mon ○Tue ○Wed ○Thu ○Fri ○Sat ○Sun  From ☐☐:☐☐  To ☐☐:☐☐
○Mon ○Tue ○Wed ○Thu ○Fri ○Sat ○Sun  From ☐☐:☐☐  To ☐☐:☐☐
Please use 24 hours (HH.MM) format

Cuisine
○ American  ○ Indian
○ Chinese   ○ Thai
○ French    ○ Japanese
○ Italian   ○ Korean
○ Mexican   ○ Greek

Payment Types
○ AMX         ○ Diners Club
○ Master Card ○ Carte Blanche
○ Discover    ○ Visa
○ Check

Specialty
○ Barbeque  ○ Steakhouse
○ Bistro    ○ Vegetarian
○ Cajun     ○ Salad Bar
○ Deli      ○ Sandwiches
○ Pizza     ○ Coffee House
○ Seafood   ○ Burger

Location
○ North       ○ North/East
○ North/West  ○ South
○ South/East  ○ South/West
○ East        ○ West
○ Down Town

Frame For 'Menu Du Jour'
○1  ○2  ○3  ○4  ○5  ○6
○7  ○8  ○9  ○10 ○11 ○12

*521 — Restaurant Update
Please write legible and in print

Account — 533
*600000* — 532

Please check all that apply
- Smoking
- Valet Parking
- Catering
- Private Parties
- Full Bar
- Reservation Required
- Outdoor Seating
- Sunday Brunch
- Live Entertainment

Happy Hours
○Mon ○Tue ○Wed ○Thu ○Fri ○Sat ○Sun  From HH:MM  To HH:MM
○Mon ○Tue ○Wed ○Thu ○Fri ○Sat ○Sun  From HH:MM  To HH:MM
Please use 24 hours (HH,MM) format

Delivery Hours
○Mon ○Tue ○Wed ○Thu ○Fri ○Sat ○Sun  From HH:MM  To HH:MM
○Mon ○Tue ○Wed ○Thu ○Fri ○Sat ○Sun  From HH:MM  To HH:MM
Minimum Order $▯▯▯.▯▯
Please use 24 hours (HH,MM) format Restaurant Picture (optional)

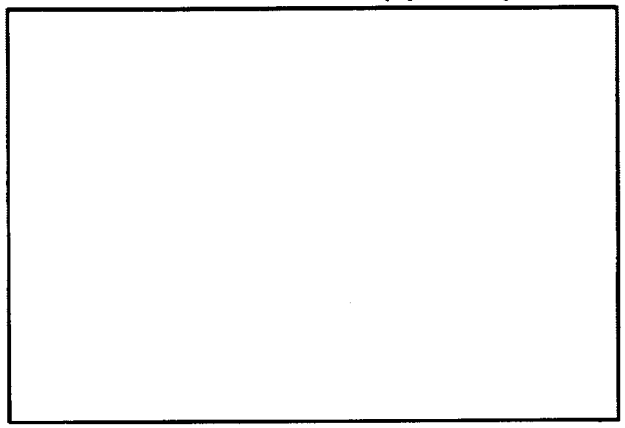

*MenuHost*
*Fax: (713)977-8229*

Account
 ─ 774
\* 6 0 0 0 0 0 \*

772
○ Today's Special  ● Kids Special  ○ Special Events

Please print eligible (B&W only)  ─ 773

1/2 OFF on

KIDS MENU

*Every Thursday*

*from 4:30 to 6:30*

Sample Restaurant                                111.111.1111

771

1146549695

MenuHost
Fax: (713)977-8229

Account

/— 774

*6 0 0 0 0 0*

○ Today's Special   ○ Kids Special   ● Special Events /—776

Please print eligible (B&W only)   /—777

Father's Day Special

Grilled Double Lamb Chops
$19.95 (reg. $25.95)

Veal Chop 16oz.
$25.95 (reg. $28.95)

Broiled Salmon Fillet
$15.95 (reg. $18.95)

Sample Restaurant    111.111.1111

3906190660　　MenuHost - Discount Coupons
Fax: (713)977-8229

786 — [barcode] Account — 783 Post From　784 Post To

781 — * 6 0 0 0 0 0 * — 782

| 781 | 782 | 783 Post From | 784 Post To |
|---|---|---|---|
| ○0 ○0 Percent○ ○1 ○1 ○2 ○2 Dollars○ ○3 ○3 ○4 ○4 ○5 ○5 ○6 ○6 ○7 ○7 ○8 ○8 ○9 ○9 | ○0 ○0 Percent○ ○1 ○1 ○2 ○2 Dollars○ ○3 ○3 ○4 ○4 ○5 ○5 ○6 ○6 ○7 ○7 ○8 ○8 ○9 ○9 | ○Jan　Day ○Feb (2 digits) ○Mar ○0 ○0 ○Apr ○1 ○1 Month ○May ○2 ○2 ○Jun ○3 ○3 ○Jul　　○4 ○Aug　　○5 ○Sept　○6 ○Oct　　○7 ○Nov　　○8 ○Dec　　○9 | ○Jan　Day ○Feb (2 digits) ○Mar ○0 ○0 ○Apr ○1 ○1 Month ○May ○2 ○2 ○Jun ○3 ○3 ○Jul　　○4 ○Aug　　○5 ○Sept　○6 ○Oct　　○7 ○Nov　　○8 ○Dec　　○9 |

787 —

Restaurant A
1234 Street
B City, C State, Zip Code
Telephone

○ Cordially Invites You And Your Guest To Enjoy Dinner Discount of 15%

○ Cordially Invites You And Your Guest To Enjoy One Complementary Menu Item When A Second Menu Item Of Equal Or Greater Value is Purchased ○ Cordially Invites You And Your Guest To Enjoy One Lunch Or Dinner Entree At 10% Off The Regular Price - Maximum Discount $10

○ Buy One Get Second Free

Offer Not Valid On Weekends
Valid Until 01/03/2000

Free○　　○Jan　Day　　　　Holidays○　　Lunch○
Half Off○　○Feb (2 digits)　Weekends○　Dinner○
　　　　　　○Mar ○0 ○0　　　　　　　　　One Menu Item○
　　　　　　○Apr ○1 ○1
　　　　Month ○May ○2 ○2
　　　　　　○Jun ○3 ○3 — 785
　　　　　　○Jul　　○4
　　　　　　○Aug　　○5
　　　　　　○Sept　○6
　　　　　　○Oct　　○7
　　　　　　○Nov　　○8
Sample Restaurant　○Dec　○9　　FIG. 7b　　713.111.1111

MenuHost - Discount Coupons
Fax: (713)977-8229

7159472577

Account: *590290 0*

Post From
- Jan
- Feb
- Mar
- Apr
- ●May
- Jun
- Jul
- Aug
- Sept
- Oct
- Nov
- Dec Day (2 digits): ●2  ●2

Post To
- Jan
- Feb
- Mar
- ●Apr
- May
- Jun
- ●Jul
- Aug
- Sept
- Oct
- Nov
- Dec Day (2 digits): ●1  ●4

Percent ●  Dollars ○  (first block: ●2)
Percent ○  Dollars ●  (second block: ●1, ●5)

Restaurant A
1234 Street
B City, C State, Zip Code
Telephone

○ Cordially Invites You And Your Guest To Enjoy Dinner Discount of 15%

○ Cordially Invites You And Your Guest To Enjoy One Complementary Menu Item When A Second Menu Item Of Equal Or Greater Value is Purchased ● Cordially Invites You And Your Guest To Enjoy One Lunch Or Dinner Entree At 10% Off The Regular Price - Maximum Discount $10

○ Buy One Get Second Free

Offer Not Valid On Weekends
Valid Until 01/03/2000

Free ○
Half Off ○

Month/Day (2 digits): ●Jul, ●1 ●1

Holidays ●
Weekends ○

Lunch ○
Dinner ○
One Menu Item ○

Sample Restaurant                                713.111.1111

FIG. 7c

METHOD AND SYSTEM FOR EDITING THE CONTENT OF A WEB SITE WITH A FACSIMILE TRANSMISSION

CROSS-REFERENCE TO RELATED APPLICATIONS

Not Applicable

STATEMENT REGARDING FEDERALLY FUNDED RESEARCH OR DEVELOPMENT

Not Applicable

REFERENCE TO A MICROFICHE APPENDIX

Not Applicable

FIELD OF THE INVENTION

The present invention relates to methods and apparatuses for interfacing with the Internet, and more particularly to a method and apparatus for interfacing, editing, and adding information to a website using a facsimile machine thereby permitting users without any programming skills to add and/or alter content on predetermined Internet websites.

BACKGROUND OF THE INVENTION

An important use of computers is the transfer of information over a network of computers. The largest computer network in existence is the Internet. The Internet is a worldwide interconnection of computer networks that communicate using a common communications protocol. Millions of computers, from low end personal computers to high-end super computers are coupled to the Internet.

One of the more popular protocols used to communicate information over the Internet and also used in private company intranets is the Hypertext Transfer Protocol (HTTP), which delivers documents typically in the form of a text document coded in a standard Hypertext Markup Language (HTML) such a document is called a Web documents. One or more related documents can make up a Web site. The network of computers that participate and support HTTP over the Internet is commonly referred to as the World Wide Web or the Web.

The Web is generally facilitated by a "Web Browser". The Web browser receives HTML documents and renders the information in conformance with the instructions and data contained within the received documents. Although text based Web browsers exist, the more common and popular Web browsers provide users with a graphical user interface (GUI) to receive and interact with information on the Web.

The architecture of the Web follows a conventional client-server model. The terms "client" and "server" are terms of art used to refer to a computer's general role as a requester of data (the client) or provider of data (the server). The roles of client and server are dynamic. During one exchange of information a computer may be the server, but during another exchange of information, the same computer may be the client.

In the Web environment, Web browsers in conjunction with computers are in the role of clients and Web documents reside on Web servers. A Web browser opens a connection to a Web server and initiates a request for a Web document. The Web server delivers the requested Web document to the Web browser. The Web document may be static or dynamic. A static Web document exists prior to any request from a client. A dynamic web document is assembled after receiving a request for a client. Dynamic Web documents enable web servers to offer more personalized and specific information to users.

Information on the Web is identified by a Universal Resource Locator (URL). A URL specifies a server and a particular document on that server. Portions of Web documents contain hypertext links which are associated with URLs. The hypertext link enables users to retrieve other Web documents by selecting the hypertext link within the Web browser. The Web browser will then request the Web document identified by the URL which is associated with the selected hypertext link.

There has been an explosion of interest in the use of the World Wide Web and the Internet in general. A presence of some kind on the Internet with a Web site has become a requisite for conducting business in today's society. Moreover, businesses exclusive to the Web are being created in record numbers.

Companies that have a presence on the Web or those that have Web sites, usually employ specially trained personnel to maintain those Web documents and Web servers that comprise the company's Web sites. These personnel are called "Web Masters" and are trained in creating documents comprised of HTML code and graphics files and maintaining the Web servers that communicated to client computers requesting specific URLs. The knowledge and training required to create and maintain a Web site can be extensive and out of the reach of most online users and small businesses.

One of the great attractions of publishing on the Web is the immediacy of the medium. If one knows how to code text and images in HTML, then a page of an entire Web site can be updated corrected or even completely overhauled in a short time and instantly made available to the millions of people who currently have access to the Web. The prerequisite training is too difficult for many people, or people are simply unmotivated to study the information required.

The present invention enables individuals and businesses to create or update the contents of a Web site using a fax machine, or a computer simulating a fax machine, or the like, without any knowledge of HTML or maintaining a Web server. Recently many patents have been issued relating to the Internet and other networking systems. None of these patents disclose the ability to maintain the contents of a Web site using a facsimile machine or the like to add or change text and possibly graphics.

U.S. Pat. No. 5,873,077, entitled Method and Apparatus for Searching for and Retrieving Documents Using a Facsimile Machine, discloses a method and apparatus that enables persons without computers to search the Web and retrieve documents. The user submits a search request via a facsimile machine. A computer reads the facsimile transmission to determine the search parameters. A search of content indexed from the Web is performed based on the search parameters. The results of the search are then transmitted via facsimile to the requesting party. This patent does not teach a method and apparatus for updating the contents of a web site using a facsimile machine.

U.S. Pat. No. 5,945,989, entitled Method and Apparatus for Adding and Altering Content on Websites, uses a telephone and interactive voice-response technology, database software, streaming audio technology to enable a user to create and modify web pages. The user interacts via the telephone to access predetermined and authorized features of the system. The patent does not disclose the use of a facsimile machine to transmit data to be used in updating a Web site.

U.S. Pat. No. 5,675,507, entitled Message Storage and Delivery System, enables users to receive facsimile messages, voice messages and data messages at a central office and then retrieve those messages from the central office using a computer with a Web browser connected to the Web. The patent does not teach the ability to update a web site using a facsimile transmission. The system disclosed in the patent uses the Web to retrieve messages that have already been delivered. The content of the message is irrelevant and remains unexamined.

BRIEF SUMMARY OF THE INVENTION

A method of updating a Web site maintained by a web server capable of receiving and responding to requests for information from Web clients and coupled to a computer database comprising the steps of transmitting an encoded transmission comprising a first portion in the format of a facsimile communication intended to be converted into digital information suitable for being stored in the computer database and a second portion identifying a key to be used by the computer database for storing the digital information. Receiving the encoded transmission and converting the first portion into the digital information having a predetermined format. Storing the digital information in the computer database using the second portion as a key to the computer database. Wherein upon receiving a request from a Web client, the Web server retrieves the digital information from the computer database and transmits the digital information to the Web client in a format compatible with the request received from Web client.

In another embodiment according to the invention, the digital information describes a discount coupon intended to be printed and presented for redemption.

In yet another embodiment according to the invention the digital information describes a classified advertisement.

In yet another embodiment according to the invention, a system for of updating a Web site maintained by a web server coupled to a computer file system and capable of receiving and responding to requests for information from Web clients comprising a digital computer coupled to the computer file system and capable of receiving a facsimile transmission and having a conversion mechanism for converting portions of a facsimile transmission into a predetermined digital information format. Wherein upon receiving a facsimile transmission the conversion mechanism converts portions of the facsimile transmission into the predetermined digital information format and stores the digital information in the computer file system. Therefore the web server can retrieve the digital information from the computer file system in response to a request for the digital information from a Web client.

In yet another embodiment according to the invention, a system for of updating a Web site maintained by a web server capable of receiving and responding to requests for information from Web clients comprising a digital computer capable of receiving a facsimile transmission and having a conversion mechanism for converting portions of a facsimile transmission into a digital information format. Further comprising a computer database system coupled to the digital computer and coupled to the Web server and capable of storing digital information organized into records whereby each record is identified by a key. Wherein upon receiving a facsimile transmission the conversion mechanism converts portions of the facsimile transmission into digital information and stores the digital information in the computer database system. Thereby enabling the web server to retrieve the digital information from the computer file system in response to a request for the digital information from a Web client.

BRIEF DESCRIPTION OF THE DRAWINGS

FIG. 5a is form that may be used in implementing the embodiment shown in FIG. 4 according to the invention.

FIG. 5b is a second part of the form shown in FIG. 5a according to the invention.

FIG. 5d is another form that may be used in implementing the embodiment shown in FIG. 4 according to the invention.

FIG. 5e is a form that may be used in implementing the embodiment shown in FIG. 4 according to the invention by allowing a restaurant to automatically update its stored information.

FIG. 6e is a representation of a world wide web page created from the information provided in the marked form shown in FIG. 6d and transmitted to a web client according to the invention.

FIG. 7b a another form similar to that shown in FIG. 7a that may be used in implementing another embodiment according to the invention.

FIG. 7c the form shown in FIG. 7b having been marked with information according to the invention.

FIG. 7d is a representation of a world wide web page created from the information provided in the marked form shown in FIG. 7c and transmitted to a web client according to the invention.

DETAILED DESCRIPTION OF THE INVENTION

Figure 1:
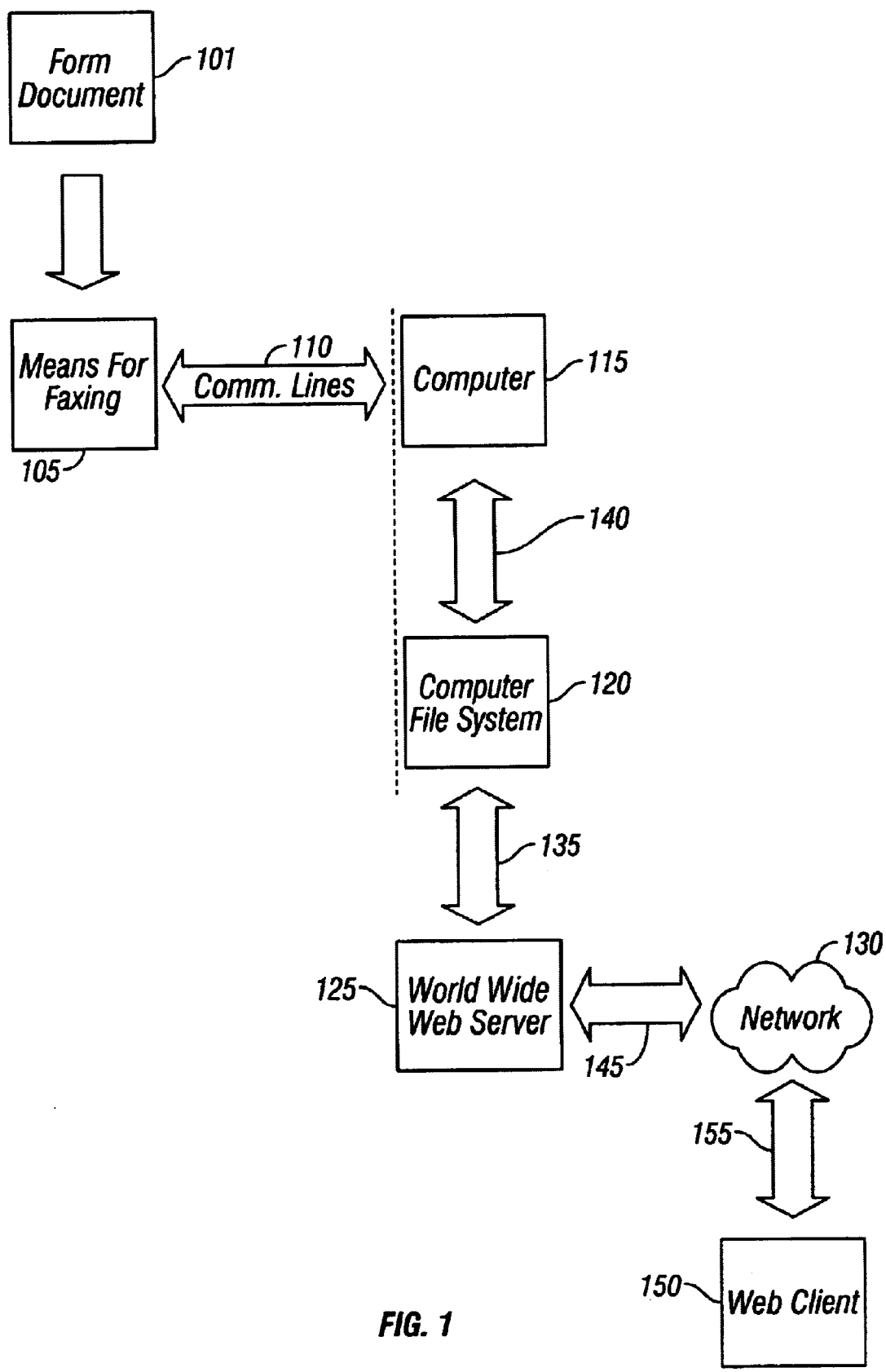
FIG. 1 is a block diagram of one embodiment according to the invention.

The present invention enables non-technical persons who have no training in producing HTML code or images to alter or update the textual, graphical and other information available on a web site using a facsimile machine. In addition, the present invention enables any person, technical or not, to make textual, graphical or other information immediately available on the World Wide Web using a facsimile machine.

As used herein the term "Internet" is the worldwide interconnection of computer networks that communicate using a common communications protocol As used herein the terms "World Wide Web" or "Web" refer to the network of computers that participate and support the exchange of information using the Hypertext Transport Protocol (HTTP) over a local area network or the Internet.

As used herein the term "Web server" refers to a computer connected to the World Wide Web that accepts requests for information and transmits the requested information using the communications protocol requested. For example, most requests to a Web server will be request information in a format that conforms to the Hypertext Markup Language specification and is transmitted using the HTTP protocol.

As used herein the term "Web client" refers to a computer or computer software program that is connected to or capable of communicating over the World Wide Web and sends requests for information to Web servers. Generally a Web client takes the form of a computer program called a Web browser that receives information in response to requests for information and is capable of displaying the information in conformance with instructions and code contained therein. A Web client is, however, not limited to a Web browser. Other forms of Web clients are used to transmit requests for information to Web servers. These Web clients are also generally computer software programs that retrieve web pages and review the contents therein. They are also called web agents, search engines, spiders, webbots and others.

As used herein the term "computer database" may be a file based database, relational database or any other type of database that is capable of storing and retrieving information upon request. A "computer file system" is a computer database that is maintained by the computer's operating system and stores and retrieves information using a file name as the key.

As used herein the term "digital information" refers to information in a format capable of being manipulated by a digital computer. For example information in ASCII format is common for the manipulation of text information by a computer. Digital information in BMP, JPEG, GIF, PIC, PNG formats are examples of digital graphics formats that are also capable of being manipulated by a computer. These formats and others may be stored in a computer database in their respective formats or converted to another format according to the parameters of the computer database.

As used herein the term "Web site" refers the information that is made available to the World Wide Web by a web server in response to receiving a request for information. Web sits are generally identified by a Universal Resource Locator or "URL" which identifies a specific computer on the network and specific information. If the URL only identifies the specific computer then the Web server will generally transmit a default response.

As used herein the terms "record" or "database record" refers to a group of related items generally referred to as "fields" and that are identified as being stored together in a computer database. The fields or items that make up a database record may not be physically stored together but are logically grouped or related for retrieval from the computer database.

As used herein the terms "key" or "database key" refers to information that identifies a particular record in a computer database. The key is generally one or more fields in the database record that uniquely identify that database record. A database key does not have to be unique but may be matched in several database records also.

Embodiment 1

FIG. 1 is a block diagram showing one embodiment of the invention. A form document 101 is transmitted by a facsimile device 105 over communication lines 110 to computer 115 that is capable of receiving a facsimile transmission. Form document 101 may contain textual information, graphical information, or other types of information. Facsimile device 105 may be a dedicated facsimile machine, or a computer having the capability of sending facsimile transmissions or some other device capable of sending facsimile transmissions. Communication lines 110 may be telephone lines, the Internet, a local or wide area network or any type of telecommunications link.

Computer 115 extracts the textual information, graphical information or other type of information from the facsimile transmission and converts the information into a predetermined digital information format, such as ASCII text, a graphics format such as BMP, PIC, GIF, JPEG, PNG, or other graphics format. Computer 115 performs the conversion by using tools such as Optical Character Recognition (OCR) software and form reading software. The facsimile transmission may contain information that is converted into text such as ASCII text. Further, the facsimile transmission may contain portions that are converted into a graphics format such as BMP, PIC, GIF, JPG, PNG, or any other computer graphics format. The converted information is then stored in the computer file system 120 in separate files or in a single file.

A Web client 150 transmits a request to the Web server 125 for the Web document that contains the converted information extracted from the facsimile transmission of form document 101. The request is transmitted over the network 130 to the Web server 125. The Network 130 may be the Internet, a company intranet, a local area network, or a wide area network. Upon receiving the request from Web client 150, the Web server 125 retrieves the converted information from the computer file system 120 and transmits it to the Web client 150. If the information is not already formatted in the format requested by the Web client 150, such as HTML format, then the Web server 125 formats the converted information appropriately to a suitable format and transmits it to the Web client 150.

Embodiment 2

Figure 2:
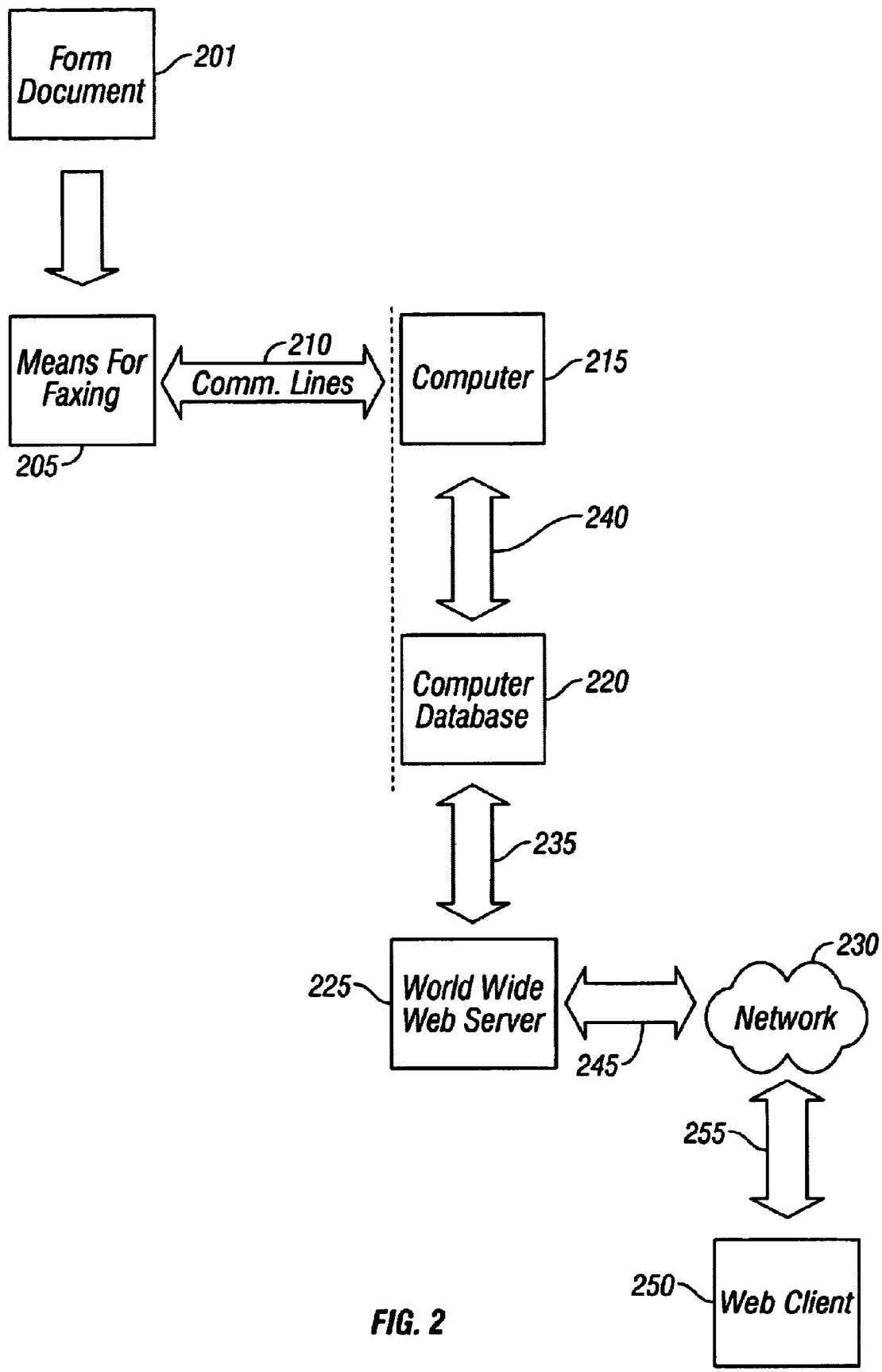
FIG. 2 is a block diagram of another embodiment according to the invention.
Figure 3:
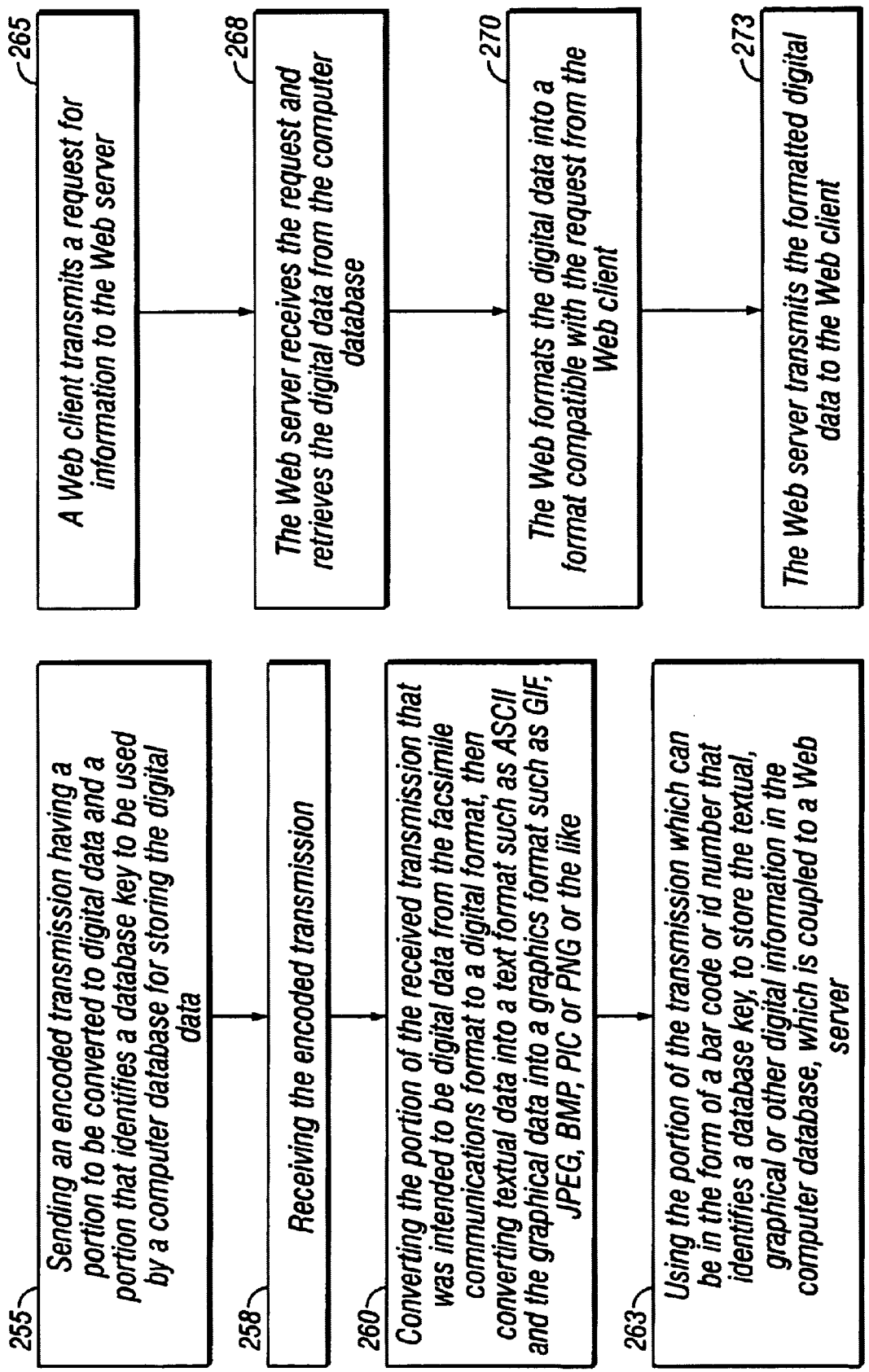
FIGS. 3a and 3b are flow diagrams related to the invention

FIG. 2 is a block diagram showing another embodiment of the invention. FIGS. 3a and 3b are flow diagrams showing the steps of operation according to the invention. A form document 201 is transmitted by a facsimile device 205 over communication lines 210 to computer 215 that is capable of receiving a facsimile transmission, as shown in box 255 in FIG. 3a. The form document 201 contains textual information, graphical information or some other type of information. The computer 215 receives the transmission, as shown in box 258 in FIG. 3a. Facsimile device 205 may be a dedicated facsimile machine, a computer having the capability of sending facsimile transmissions or some other device capable of sending facsimile transmissions. Communication lines 210 may be telephone lines, the Internet, a local or wide area network or any type of telecommunications link.

As shown in box 260 of FIG. 3a, Computer 215, through the use of Optical Character Recognition (OCR) software and form reading software, extracts the information from the facsimile transmission and converts it into a predetermined digital information format such as ASCII text, or a graphics format such as BMP, PIC, GIF, JPEG, PNG or some other graphics format. In addition the form document 201 may contain selection information that must be indicated by marking a particular choice. The digital information is stored in a computer database 220. The facsimile transmission may contain identifying information that is used to identify the record of the computer database 220 in which to save the information, as shown in box 263 of FIG. 3a. The identifying information is converted and the related information is stored according to the parameters of the computer database and the identify ing information being used as a database key.

A Web client 250 transmits a request to the Web server 225 requesting a Web document containing the digital information that was saved in the computer database 220, as shown in box 265 of FIG. 3b. The request is transmitted over the network 230 to the Web server 225. The Network 230 may be the Internet, a company intranet, a local area network, or a wide area network. Upon receiving the request from Web client 250, the Web server 225 retrieves the information from the computer database 220, as shown in box 268 of FIG. 3b. After retrieving the information from the computer database 250, the Web server 225 formats the information into the format requested by the Web client 250, as shown in box 270 of FIG. 3b. The Web server 225 then transmits the formatted information to the Web client 250 over the network 230, as shown in box 273 of FIG. 3b.

Embodiment 3

The embodiment of the invention shown in FIGS. 4, 5a, 5b, 5c, 5d, 5e and 5f enables owners of a restaurant 301 to maintain a presence on the World Wide Web 305 for the restaurant 301 with up to date accurate information without having to hire a Web Master or personnel knowledgeable in creating and HTML documents. A web host 308 maintains a Web server 310 that is connected to the World Wide Web 305 and accepts requests from a Web client 306. Implementation of the restaurant Web host 308 enables the restaurant 301 to update the information maintained by the Web host 308 and make the information available almost instantaneously on the World Wide Web 305.

The Web host 308 is capable of maintaining information for multiple restaurants. The web site, transmitted to a Web client 306, may allow a user of a Web client 306 to search for restaurants based upon predetermined search parameters. A user of a Web client 306 would then be able to view the specific information about each restaurant that met the search parameters.

Figure 4:
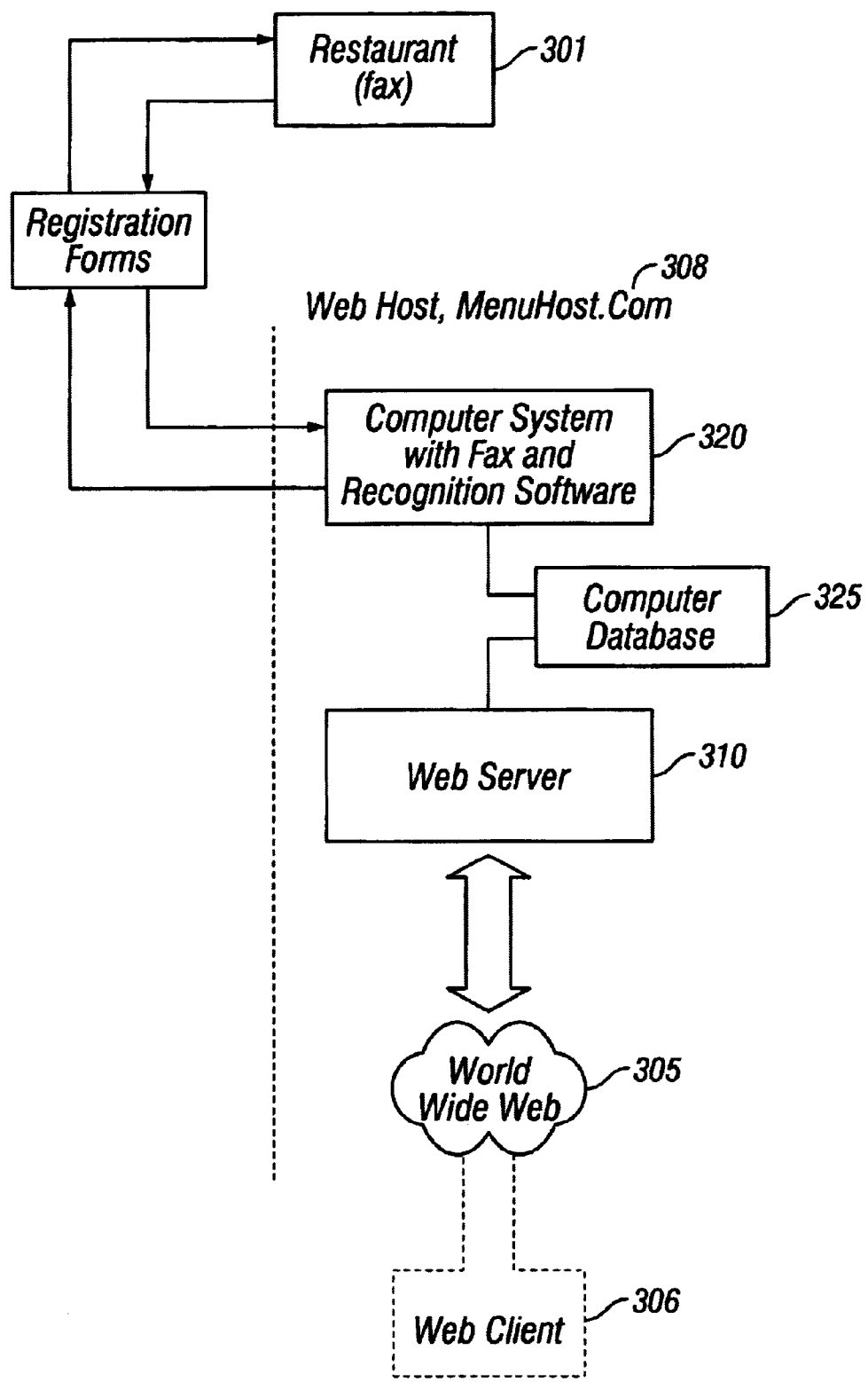
FIG. 4 is a block diagram of yet another embodiment according to the invention.

In the embodiment shown in FIG. 4, the Web host 308 has a URL of www.menuhost.com and is referred to as Menu-Host.Com. The URL is not limited to www.menuhost.com and may be any domain name or IP address that enables a Web Client 306 to access the Web server 310.

Figure 5C:
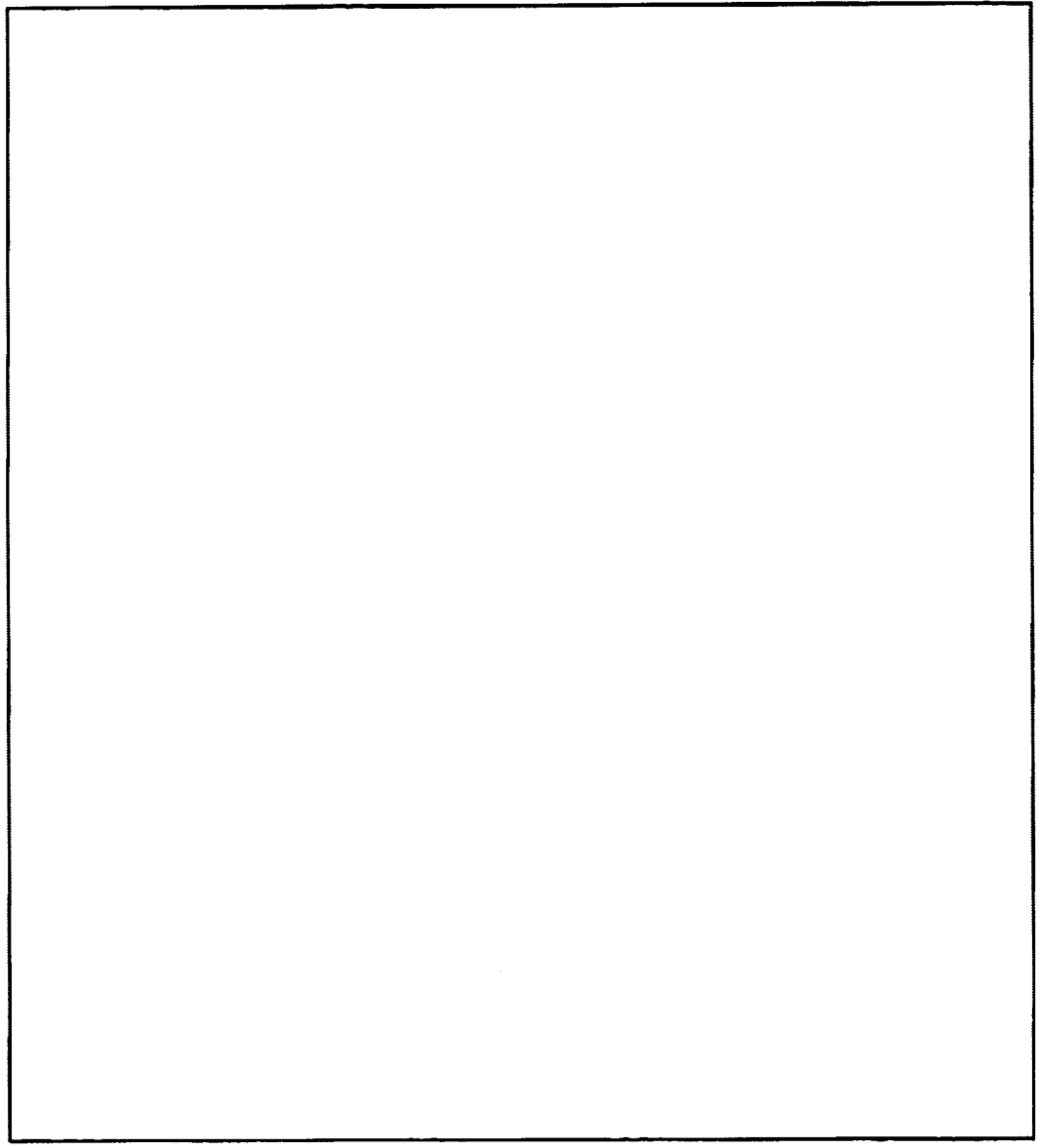
FIG. 5c is a third part of the form shown in FIG. 5a according to the invention.

A restaurant 310 requests registration forms such as forms 510, 515 and 520 shown in to FIGS. 5a, 5b, and 5c from MenuHost.Com 308. The forms are of the type that is commonly used in many fields. Ovals are used to select a category and blocks are used for the entry of alphanumeric information. A darkened oval indicates selection while an undarkened oval indicates nonselection. While the specific forms and information are specific to the embodiment according to the invention, the structure and standard entry mechanisms used to indicate information are conventional.

Forms 510, 515 and 520 are used when an account for a restaurant has not been created by MenuHost.Com. Once an account has been created then forms 530, 535 and 540 which contain the account id 524 for the respective restaurant are used to update information about the restaurant. MenuHost-.Com 308 delivers the registration forms 510, 515 and 520 to the restaurant 310 by facsimile or by other means such as hand delivery or by the postal service. Restaurant 310 marks the forms 510, 515 and 520 with the requested information. Restaurant 310 then transmits the prepared forms 510, 515 and 520 by facsimile to MenuHost.Com 308. The facsimile transmission is received by computer system 320. Computer system 320 is capable of receiving a facsimile transition. Computer system 320 identifies the type of form, extracts the textual, graphical, and choice selection information from the facsimile transmission and converts the information into a predetermined digital format capable of being manipulated by a digital computer such as ASCII for the textual information, a graphics format such as GIF, JPEG, PNG, PIC, BMP or some other graphics format for the graphical information, and a boolean indicator, enumerated type or the like for the choice selection information. Computer system 320 may use optical character recognition (OCR) algorithms or specialized OCR and form software to perform the extraction and conversion of the textual, graphical or choice selection information.

The TELEFORM (TRADEMARK) software product is an example of computer software that is capable of receiving a form that has been transmitted by facsimile and extracting and converting the information contained therein for storage in a computer database. Other software products and tools exist that perform generally the same function and may also be used. The technology used by the TELEFORM (TRADEMARK) software is known in the art. The forms to be transmitted are created using the TELEFORM (TRADEMARK) software. TELEFORM (TRADEMARK) maintains a database concerning the forms created. When a form is received it contains information that identifies the form. TELEFORM (TRADEMARK) maintains a separate database that identifies created forms. TELEFORM (TRADEMARK) is then able to identify the information contained on the form received from restaurant 301 and store the specific textual, graphical or choice selection information in a specified computer database 325, keyed on a specific field such as the restaurant name or PIN number issued by MenuHost.Com.

In the present embodiment, TELEFORM is able to identify forms 510, 515, 520, 530, 535 or 540 by bar codes 512, 517, 522, 524, 521, and 526 respectively. The forms are generally described to the form conversion software prior to accepting forms for conversion. This enables the form conversion software such as TELEFORM (TRADEMARK) to maintain very specific information about each form and thereby enable the form conversion software to maintain accuracy in the conversion process.

After identifying the forms, TELEFORM (TRADEMARK) is then able to determine that information obtained from the characters in blocks 531 within group 536 indicate the name of the restaurant and should be stored in the computer database 325 as the restaurant name field for the database record for the identified restaurant. Similarly, TELEFORM (TRADEMARK) is able to determine that the information within group 537 represents the Business Days and Hours of operation for the restaurant identified by blocks 531. The extracted textual, graphical and choice selection information is stored as fields of the record in the computer database 325 created for the identified restaurant. TELEFORM (TRADEMARK) can also determine the information indicated in the other blocks and selections for storing in the computer database 325.

To change the current state of information maintained by MenuHost.Com 308, restaurant 301 may transmit a set of forms 530, 535, and 540 with the new information. The Identification number 532 and identification bar code 533 identify the restaurant. The information is extracted and converted. The computer database 325 is then updated with new information and the old unchanged information is left in place.

Form 535 in FIG. 5e is similar to form 515 in FIG. 5b, except form 535 is used to update the digital information in a computer database 325. Form 535 has a barcode 533 and id number 532 that uniquely identifies a restaurant. Therefore the information indicated and marked on form 535 will be used to update the computer database record for the restaurant associated with the account bar code 533 and id number 532.

Figure 5F:
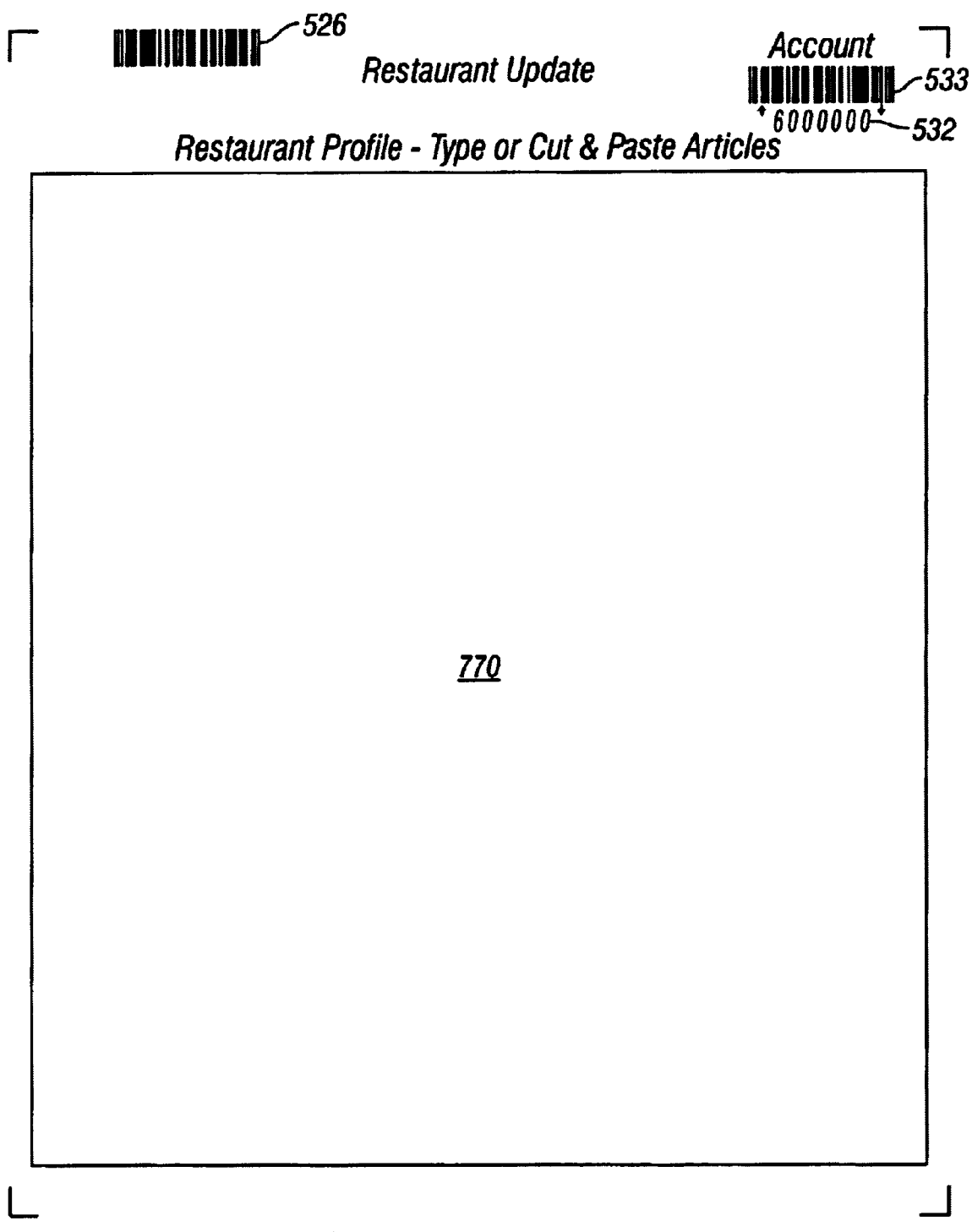
FIG. 5f is a form that may be used in implementing the embodiment shown in FIG. 4 according to the invention.

Form 540 in FIG. 5f is similar to form 520 in FIG. 5c, except form 540 is used to update the digital information in a computer database 325. Form 540 has a barcode 533 and id number 532 that uniquely identifies a restaurant. Block 770 is used to include a graphic or any other type of information that the restaurant wants to make available to the Web. The information placed in the block 770 of form 540 in FIG. 5f will appear on the Web as it appears within the block. Therefore the information inside block 770 will be used to update the computer database record for the restaurant associated with the account bar code 533 and id number 532.

Because the restaurant information is stored in the computer database 325 as textual, graphical and choice selection information, the Web server 310 may access the information to perform searches in response to requests or selections made by a Web client 306. The information may then be formatted in conformance with requests made by Web client 306 and transmitted to a Web client 306. For example the information may be formatted into an HTML document and transmitted using the HTTP communications protocol to a Web client 306.

Embodiment 4

Another embodiment according to the invention is shown in FIGS. 6a–6e. This embodiment may be used independently or as an improvement to Embodiment 3. Restaurants oftentimes have daily specials, sometimes referred to as "Today's Special", "Kid's Special" or "Special Events", which consist of one or more items available at a reduced or special price. Informing the public of which items comprise the specials is critical to the success of a restaurant's promotional program.

This embodiment enables a restaurant to make its specials available on the Web almost instantaneously by transmitting via facsimile to MenuHost.Com its special menu and an identity indicator.

Figure 6A:
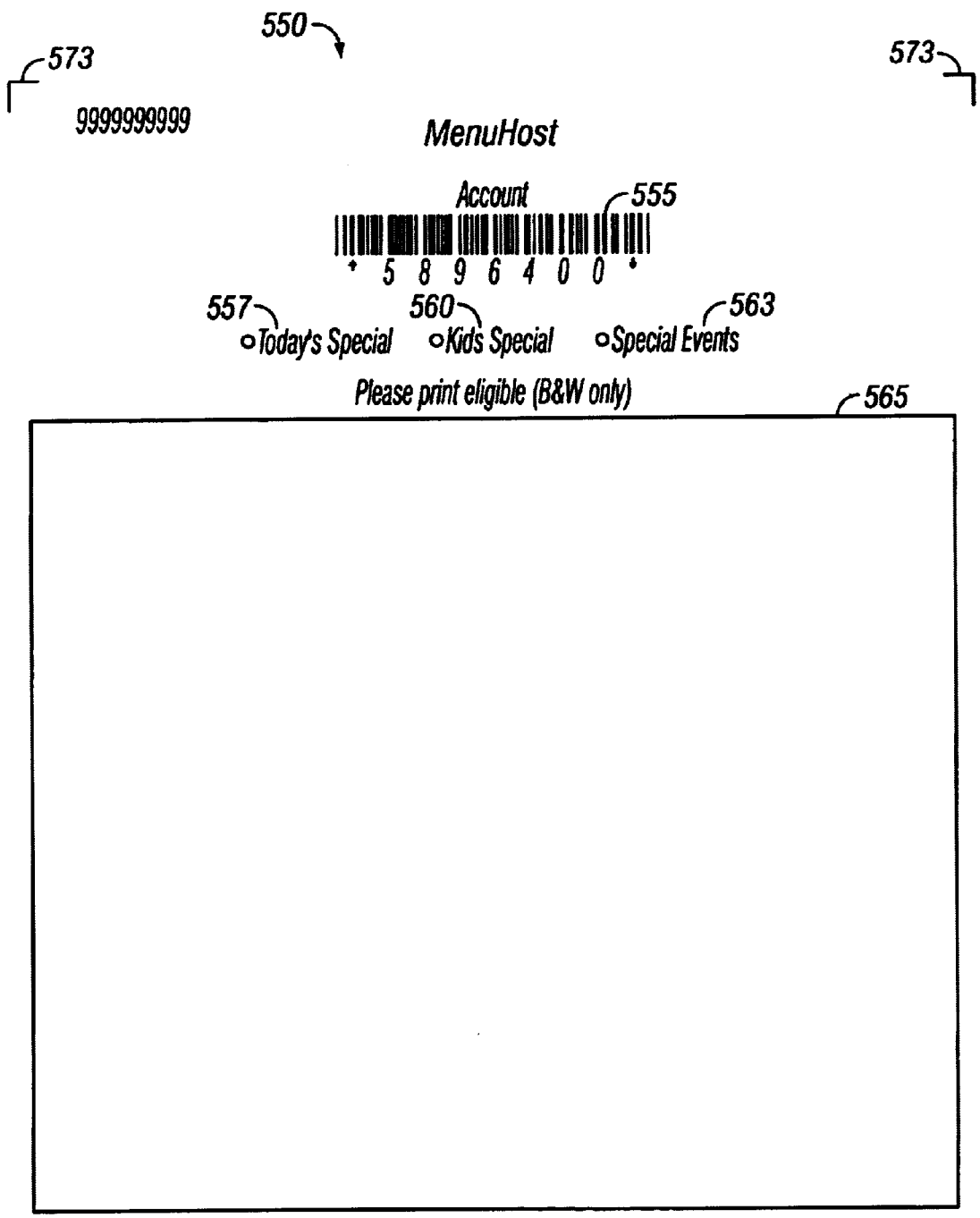
FIG. 6a is a fourth form that may be used in implementing another embodiment according to the invention.

FIG. 6a shows a form 550 defined by corner borders 573. The corner borders 573 enable recognition software such as TELEFORM to determine the outer boundaries of the form received via facsimile transmission. A restaurant, as described in embodiment 3, prepares the form 550 to include the restaurant's representation of the special menu. The information contained in box 565 will be converted into a graphics file format. Therefore, the restaurant has control of the visual representation that will be made available on the Web. Selection circle 557 indicates that the information contained in box 565 is for a "Today's Special".

Selection circle 560 enables a restaurant to also make available on the Web a "Kid's Special" menu. The darkening of selection circle 560 instead of selection circle 557 indicates to the recognition software that the information contained in box 565 should be stored under the Kids Special field of the computer database in the record with a database key identified by bar code 555. Bar code 555 identifies the particular restaurant transmitting the form 550 and is converted into a value that is used as a computer database key.

Similarly, selection circle 563 enables a restaurant to make "Special Events" information available on the Web. The darkening of selection circle 563 indicates to the recognition software that the information contained in box 565 should be stored under the Special Events field of the computer database in the database record with a database key identified by bar code 555.

Identification number 553 is used by the recognition software to identify the particular form that is being received and converted. Using corner borders 573 and identification number 553, the recognition software is able to determine where the predetermined areas of information on the form are located and which fields of a particular computer database record to which those areas of information are associated.

Form 550 in FIG. 6a has alphanumeric characters 567 which may represent the name of the restaurant and alphanumeric characters 570 which may represent the telephone number of the restaurant transmitting form 550 to MenuHost.Com. These representations enable human identification of the intended restaurant for the form and may be secondary computer database keys if the primary database key indicator bar code 555 is not legible. The computer database would be able to find the appropriate computer database record by searching on restaurant name or telephone number.

Figure 6B:
FIG. 6b is an example of the form shown in FIG. 6a having been marked according to the invention.
Figure 6C:
FIG. 6c is a representation of a world wide web page created from the information provided in the marked form shown in FIG. 6b and transmitted to a web client according to the invention.

FIG. 6b shows a form that is similar to form 550 in FIG. 6a. Selection oval 772 is darkened to indicate that the information in box 773 contains the "Kid's Special" for the restaurant identified by bar code 774. The information in box 773 will be converted into a graphic and stored in a computer database as the Kids Special for the restaurant identified by bar code 774. FIG. 6c shows a representation of a web page that would be transmitted to a web client requesting information about the Kids Special for the restaurant. The graphic 775 is a representation of the image placed by the restaurant in box 773 of form 771.

Figure 6D:
FIG. 6d is another example for the form shown in FIG. 6a having been marked according to the invention.
Figure 6E:
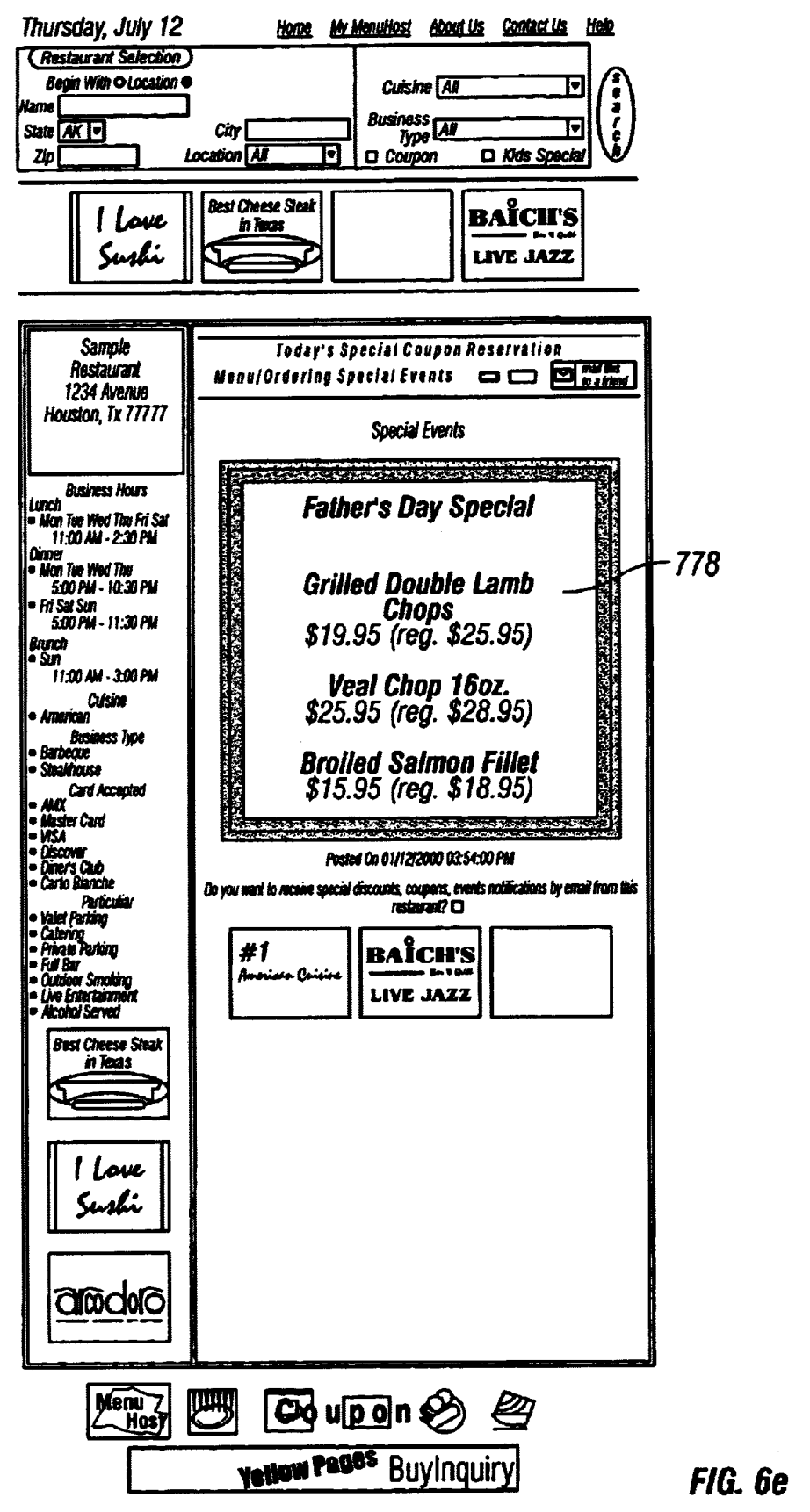

FIG. 6d shows a form 779 that is similar to form 550 in FIG. 6a. Selection oval 776 is darkened to indicate that the information in box 777 contains the "Special Events" for the restaurant identified by bar code 774. The information in box 773 will be converted into a graphic and stored in a computer database as the Special Events for the restaurant identified by bar code 774. FIG. 6e shows a representation of a web page that would be transmitted to a web client requesting information about the Special Events for the restaurant. The graphic 778 is a representation of the image placed by the restaurant in box 777 of form 779.

Embodiment 5

Another embodiment according to the invention is shown in FIGS. 7a–7e. This embodiment may be used independently or as an improvement to Embodiment 2 or Embodiment 4. Restaurants may want to offer the public incentives for dining. Oftentimes such incentives take on the form of coupons. A customer tenders the coupon to the restaurant and receives the value printed thereon. The main concern of the restaurant is getting the coupon into the hands of potential customers.

This embodiment enables a restaurant to make discount coupons available on the Web almost instantaneously by transmitting via facsimile to MenuHost.Com a description of the coupon incentive being offered and allow MenuHost.Com to make the coupon available on the Web. In addition, the coupon could be transmitted over the Web in such a format for printing onto paper.

Figure 7A:
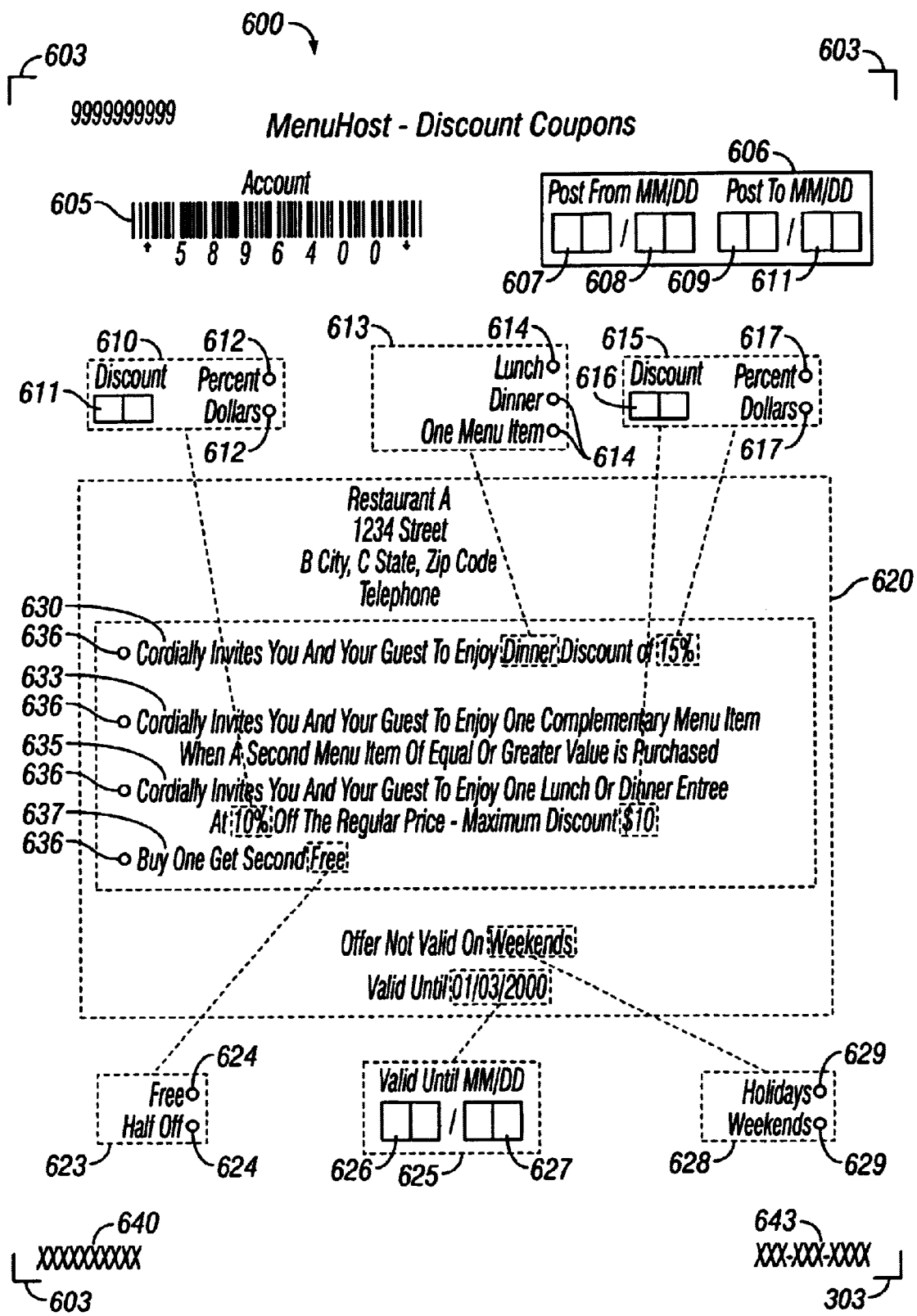
FIG. 7a is a fifth form that may be used in implementing another embodiment according to the invention.

FIG. 7a shows a form 600 defined by corner borders 603. The corner borders 603 enable recognition software such as TELEFORM to determine the outer boundaries of the form received via the facsimile transmission from the restaurant to MenuHost.Com. A restaurant, such as that described in embodiment 3, prepares the form 600 for transmitting to a Web host such as MenuHost.Com. The restaurant has control of the coupon parameters that will be made available to the public and can create or change coupons available on the Web using the simplicity of a facsimile machine.

Form 600 enables a restaurant to choose from coupon selections 630, 633, 635, and 637 by darkening the selection circle 636 associated with the chosen coupon selection. Except for coupon selection 633, the coupon selections have parameters which are customizable by the restaurant. Box 620 of form 600 indicates the general appearance of the coupon. Because forms are specific to the restaurant with identifying indicia such as bar code 605 and name 640, the name and location information about the restaurant may also be placed on the coupon form that is used by the restaurants to submit their discount coupon directives to a Web host like MenuHost.Com described previously.

Coupon selection 630 enables a restaurant to offer a discount coupon for a percentage or specific dollar amount off the cost of either lunch, dinner, or any one menu item. If coupon selection 630 is chosen the restaurant must also choose between lunch, dinner or any one item by selecting the appropriate selection circle 614 in box 613. In box 615 the discount numerical amount must also be provided in numeral edit boxes 616. The appropriate selection circle 617 must then be darkened to indicate the appropriate unit of measurement for the discount numerical amount in edit boxes 616.

Coupon selection 633 enables a restaurant to make available a coupon in which the patron can receive a complimentary menu item when a second menu item of equal or greater value is purchased. To offer this type of coupon the restaurant must darken the selection circle 636 associated with coupon selection 633.

Coupon selection 635 enables a restaurant to offer a coupon that invites the patron and a guest to enjoy one lunch or dinner entree with a certain amount either percentage or dollar amount off the regular price. Coupon selection 635 also enables the restaurant to set a maximum discount amount by indicating in numeral edit boxes 616 the maximum amount and the unit of measurement in selection circles 617. The discount is entered in numeral edit boxes 611 with the unit of measurement, percent or dollars, indicated by selection circles 612.

Coupon selection 637 enables a restaurant to offer a coupon enabling a patron to buy one menu item and get the second choice free or for half off the listed price. The selection of free or half off is made by darkening the appropriate selection circle 624 in box 623.

Generally, coupons have an expiration date after which a restaurant will not honor the discount printed thereon. Form 600 enables a restaurant to choose the expiration date and indicate the chosen date on the discount coupon by entering the month in numeral edit boxes 626 and the day in numeral edit boxes 627 in form box 625. If no date is entered then no expiration date will appear on the coupon made available on the Web.

A restaurant may wish to disclaim a coupon that is otherwise valid during peak times such as holidays or weekends. Form box 628 enables a restaurant to have indicated on the coupon that the discount offer is not valid on holidays and/or weekends by darkening the appropriate selection circles 629.

Generally coupons are made available to the public for a certain period of time after which an analysis of the effectiveness of the offer is made. The restaurant can indicate in box 606 of form 600 the period of time in which to make the coupon available on the Web. After the expiration of the indicated period the coupon is no longer made available on the Web by MenuHost.Com. Form box 606 has numerical edit boxes for providing a post from date and a post to date. The month and day to begin making the discount coupon available on the Web is entered in numerical edit boxes 607 and 608 respectively. The month and day to stop making the discount coupon available is entered into numerical edit boxes 609 and 611 respectively. These values are extracted and converted by the recognition software and stored in the computer database record associated with the restaurant identified by bar code 605.

Form 600 in FIG. 7a has alphanumeric characters 645 which may represent the name of the restaurant and alphanumeric characters 643 which may represent the telephone number of the restaurant transmitting form 600 to MenuHost.Com. These representations enable human identification of the intended restaurant for the form and may be secondary computer database keys if the primary database key indicator bar code 605 is not legible. The computer database would be able to find the appropriate computer database record by searching on restaurant name or telephone number.

FIG. 7b shows another a form 780 similar to form 600 in FIG. 7a. Form 780 has replaced form boxes 606, 610, 615, and 625 with form blocks 781, 782, 783, 784 and 785. Form 780 uses oval selections to enable the restaurant to enter information instead of using edit blocks. Oval or circular selections or preferable to edit blocks. Edit blocks requires the restaurant to mark a alphanumeric character in the block the computer software must then convert this information into its digital representation usually ASCII. The accuracy of the conversion depends largely on the legibility of the alphanumeric character. If the person marking the edit box does not form the characters fully and carefully, the accuracy of the conversion degrades. Whereas when using an oval or circular selection the conversion software or device recognizes two choices darkened or not darkened. The TELEFORM or other software has information indicating what each available oval or circular selection represents on the form. Thus, if an oval is darkened then the software knows exactly what information was selected. In addition using oval or circular selections instead of edit blocks ensures that the data received will be formatted correctly. The restaurant identifies the specific information but leaves the format up to the software. For example, choosing a date as shown in form block 785 lets the computer determine what format to store the date, either numerical with month, date, year (mm/dd/yy) or (mm/dd/yyyy).

Form block 781 represents the percentage discount that will be had if the coupon is tendered by a consumer. There are two columns, 786 and 787. Column 787 represents the ones place for the percentage and column 787 represents the tens place for the percentage. Form block 781 allows for the range of 0–99. FIG. 7c shows form block 789 of form 790 with circular selections 791, 792, and 793 darkened. The position of circular selection 793 indicates that the numeric value indicated by selection circles 791 and 792 is a percentage. 791 represents a zero (0) for the ones place and 792 represents a two (2) for the tens place. Thus indicating a percentage of twenty (20) percent. Had the user been forced to write numerical value there would exist a greater opportunity to introduce errors into the process. The numerical value could be interpreted as a different value and end with dissatisfied customers who were unable to redeem coupons for higher values than what the restaurant had intended.

Form box 794 is to indicate a percentage or dollar amount. Lines 795 and 796 associate form block 794 with coupon selection choice 797 and 799. The coupon selection choices 797, 798, 799, and 800 are mutually exclusive. Therefore, one form entry block may be used for multiple coupon selection choices.

Form block 801 and 802 as marked indicate that the coupon should be made available on the Web from June 22 until July 14. Similarly, form block 803 as marked indicates the date until which the coupon will be valid.

FIG. 7d shows the coupon 805 displayed by a web client upon requesting from the web server or menuhost.com. The coupon 805 corresponds to the information indicated in form 790 in FIG. 7c.

Embodiment 6

Figure 8:
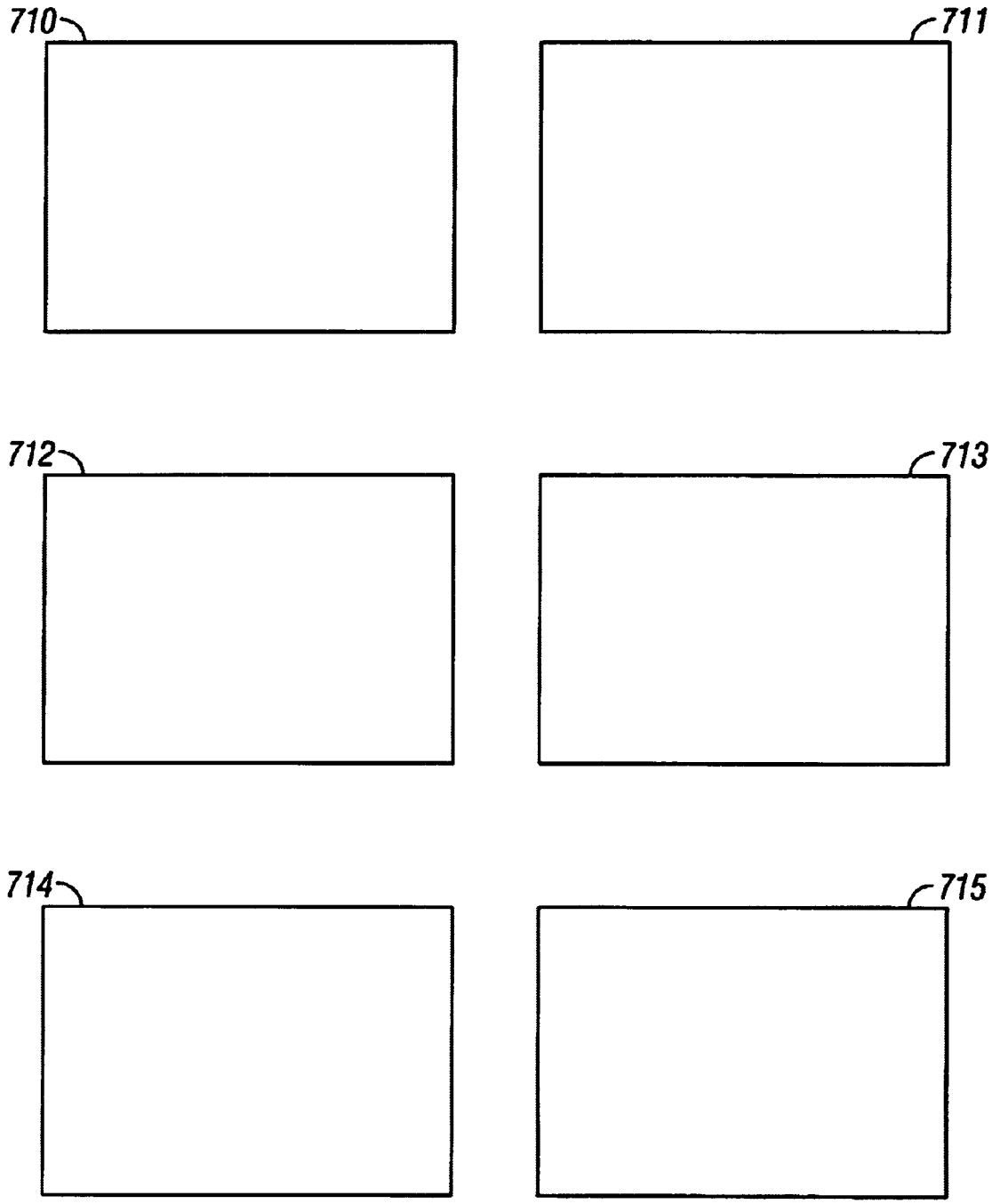
FIG. 8 is a representation of a web page that enables businesses to make discount coupons or advertisements available on the Web using a facsimile machine.

Another embodiment according to the invention enables businesses to make discount coupons and advertisements instantaneously available on the World Wide Web using a facsimile machine. FIG. 8 shows an example of web page that has graphical boxes 710–715 that are assigned respectively to participating businesses. Using the technology as described herein, each participating businesses may transmit via facsimile machine its respective discount coupon information or advertisement information to the web host. The web host then extracts the discount coupon information or advertisement information and converts it into an appropriate digital format for transmitting to a requesting web client. The Web Page as shown in FIG. 8 would be transmitted as HTML using the HTTP communications protocol.

Figure 9:
FIG. 9 is another form according to the invention that allows a clothing retail store owner to describe coupon parameters and make them available on the Web.

FIG. 9 shows a form 850 for marking information for a discount coupon tailored for use by a retail clothing store. Form block 851 enables the category for the coupon to be selected the choices indicated in form block 851 are not limiting but are only set forth as examples. Form block 852 enables a store owner to place a general description for the coupon that will be displayed on the Web. Item description form block 852 is preferable because there exists many more variables than in a restaurant as disclosed. Form block 853 shows the general layout of the coupon that will be made available for display on the Web. Form block 854 enables the store owner to indicate the value of the discount coupon using dollars or percentage as the unit of measurement. Form block 855 enables the store owner to indicate the range of dates between which the coupon will be valid. Form block 856 enables the store owner to indicate the range of dates between which the coupon should be made available on the Web. The information is received and identified by bar code 857 and stored according to store associated with bar code 857 and id number 858.

Embodiment 7

Figure 10:
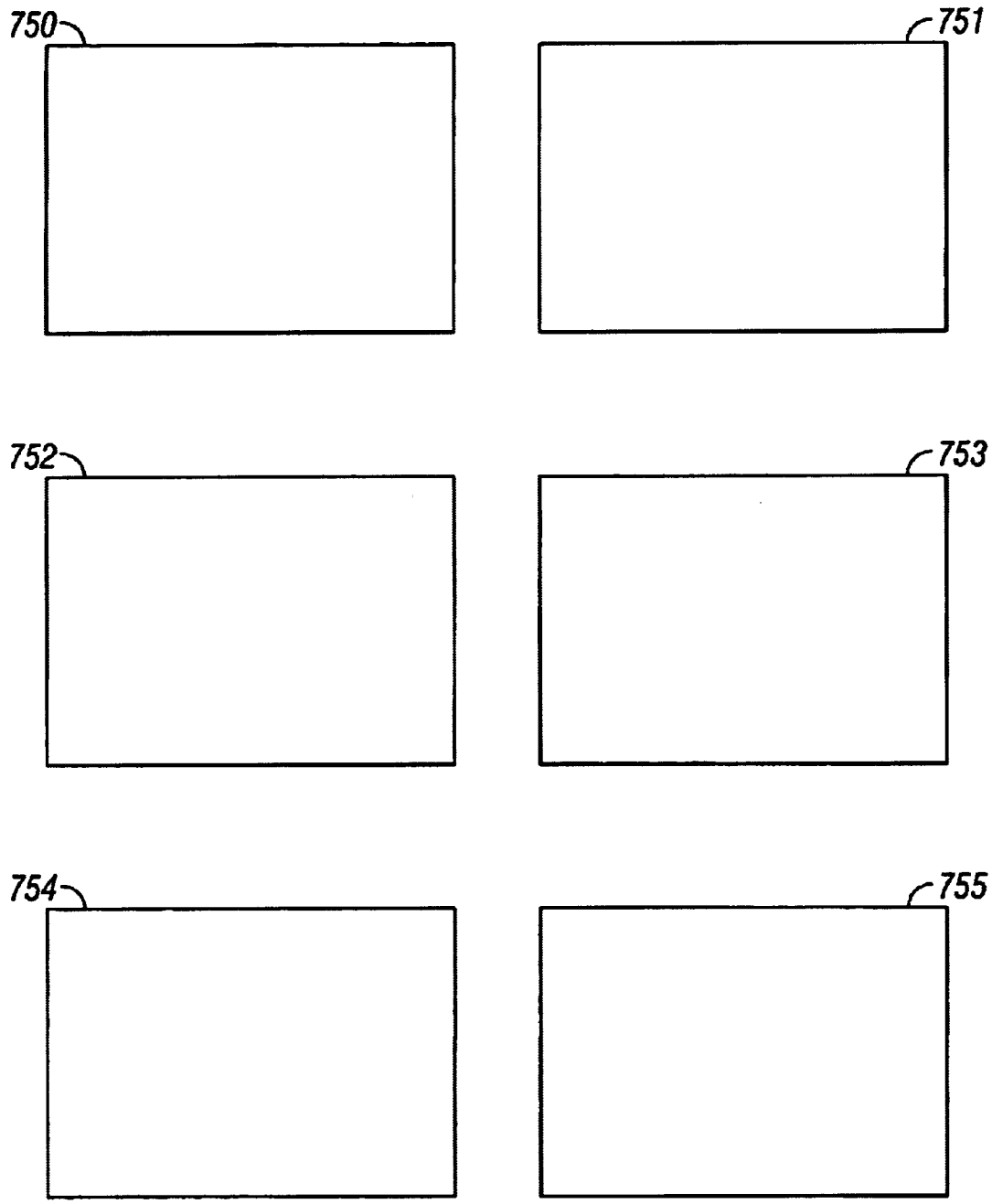
FIG. 10 is a representation of a web page that enables individuals to make classified ads available on the Web using a facsimile machine.

Similarly, instead of discount coupons or advertisements for business the same technology and implementation can be used to make classified advertisements available on the World Wide Web. FIG. 10 shows a web page in which individual classified adds can be transmitted and displayed by a requesting web client using the technology described herein. Individuals transmit their classified information by facsimile to the web host computer. The web host computer then extracts the information from the facsimile transmission and converts it into the appropriate textual or graphical digital format, such as ASCII for text or GIF, JPEG, PNG, PIC, or BMP for graphics formats. A web client requesting to view classified ads is transmitted an HTML document using HTTP that when displayed may resemble that shown in FIG. 9 with the individual ads being displayed in ad boxes 750–755 respectively.

There has been described herein novel system and methods. It is evident that those skilled in the art may now make numerous uses and modifications of and departures from the specific embodiments described herein without departing from the inventive concepts. Consequently, the invention is to be construed as embracing each and every feature and novel combination of features and steps present or possessed by the system and methods herein disclosed and limited solely by the spirit and scope of the appended claims. Changes may be made in the various elements or assemblies or components or in the steps or in the sequence of steps described herein without departing from the spirit and the scope of the invention as defined in the following claims.

What is claimed is:

1. A method of updating, from the point of view of Web clients, a Web site maintained by a web server capable of receiving and responding to requests for information from said Web clients and coupled to a computer database comprising the steps of:

transmitting an encoded transmission comprising a first portion in the format of a facsimile communication intended to be converted into digital information suitable for being stored in said computer database and a second portion identifying a key to be used by said computer database for storing said digital information;

receiving said encoded transmission;

converting said first portion into said digital information having a predetermined format; and storing said digital information in said computer database using said second portion as a key to the computer database;

wherein upon receiving a request from a Web client, said Web server retrieves said digital information from said computer database and transmits said digital information to said Web client in a format compatible with the request received from said Web client;

whereby from the point of view of said Web client, the Web site perceived by said Web client includes said digital information and thereby, is an updated Web site.

2. A method for enabling a restaurant to create and update information, from the point of view of Web clients, available on a Web site maintained by a web host having a Web server capable of receiving and responding to requests for information from Web clients and coupled to a computer database comprising the steps of:

said restaurant transmitting an encoded transmission in the format of a facsimile communication intended to be converted into digital information having a predetermined format and suitable for being stored in said computer database;

receiving said encoded transmission;

converting said encoded transmission into said digital information having said predetermined format; and storing said digital information in said computer database using a portion of said digital information as a key to the computer database;

wherein upon receiving a request from a Web client, said Web server retrieves said digital information from said computer database and transmits said digital information to said Web client in a format compatible with the request received from said Web client;

whereby from the point of view of said Web client, the Web site perceived by said Web client includes said digital information and thereby, is an updated Web site.

3. The method as claimed in claim 2, wherein said digital information includes a discount coupon capable of being redeemed for the value indicated thereon.

4. The method as claimed in claim 2, wherein said digital information includes at least one menu item from said restaurant.

5. The method as claimed in claim 3, wherein said digital information also includes at least one menu item from said restaurant.

6. The method as claimed in claim 1, wherein said digital information describes a discount coupon intended to be printed and presented for redemption.

7. The method as claimed in claim 1, wherein said digital information describes a classified advertisement.

8. A method of updating, from the point of view of Web clients, a Web site maintained by a web server capable of receiving and responding to requests for information from Web clients and coupled to a computer database comprising the steps of:

transmitting to a remote location an encoded transmission comprising a first portion in the format of a facsimile communication intended to be converted into digital information suitable for being stored in said computer database and a second portion identifying a key to be used by said computer database for storing said digital information;

said remote location being adapted to receive said encoded transmission, convert said first portion into said digital information having a predetermined format, and store said digital information in said computer database using said second portion as a key to the computer database; wherein upon receiving a request from a Web client, said Web server retrieves said digital information from said computer database and transmits said digital information to said Web client in a format compatible with the request received from said Web client; and viewing said digital information on said web site;

whereby from the point of view of said Web client, the Web site perceived by said Web client includes said digital information and thereby, is an updated Web site.

9. The method as claimed in claim 8, wherein said digital information describes a discount coupon intended to be printed and presented for redemption.

10. The method as claimed in claim 8, wherein said digital information describes a classified advertisement.

* * * * *